United States Patent [19]
Gray

[11] 4,069,581
[45] Jan. 24, 1978

[54] MUFFIN SPLITTER

[76] Inventor: Robert E. Gray, 208 Gansvoort St., Fulton, N.Y. 13069

[21] Appl. No.: 688,527

[22] Filed: May 21, 1976

[51] Int. Cl.² ............................................... A21C 15/04
[52] U.S. Cl. ......................................... 30/114; 99/537
[58] Field of Search ............... 99/430, 515, 537; 83/2, 83/6, 660, 838, 841, 842; 30/363, 358, 366, 114

[56] References Cited
U.S. PATENT DOCUMENTS 2,818,097  12/1957  Glanz .................................... 99/537

*Primary Examiner*—Edward L. Roberts
*Attorney, Agent, or Firm*—Charles S. McGuire

[57] ABSTRACT

A unitary device for splitting into substanitally equal halves a previously uncut muffin, or the like. The device is constructed in two hingedly-connected parts each having a plurality of tines extending fixedly therefrom in parallel relation. The parts are moved to a first position, wherein all the tines are arranged in a single, parallel row, and a muffin is inserted sideways so that it is pierced by the tines. Upon movement about the hinged connection away from this position the tines of the two parts are separated, breaking the muffin transversely into two parts.

6 Claims, 2 Drawing Figures

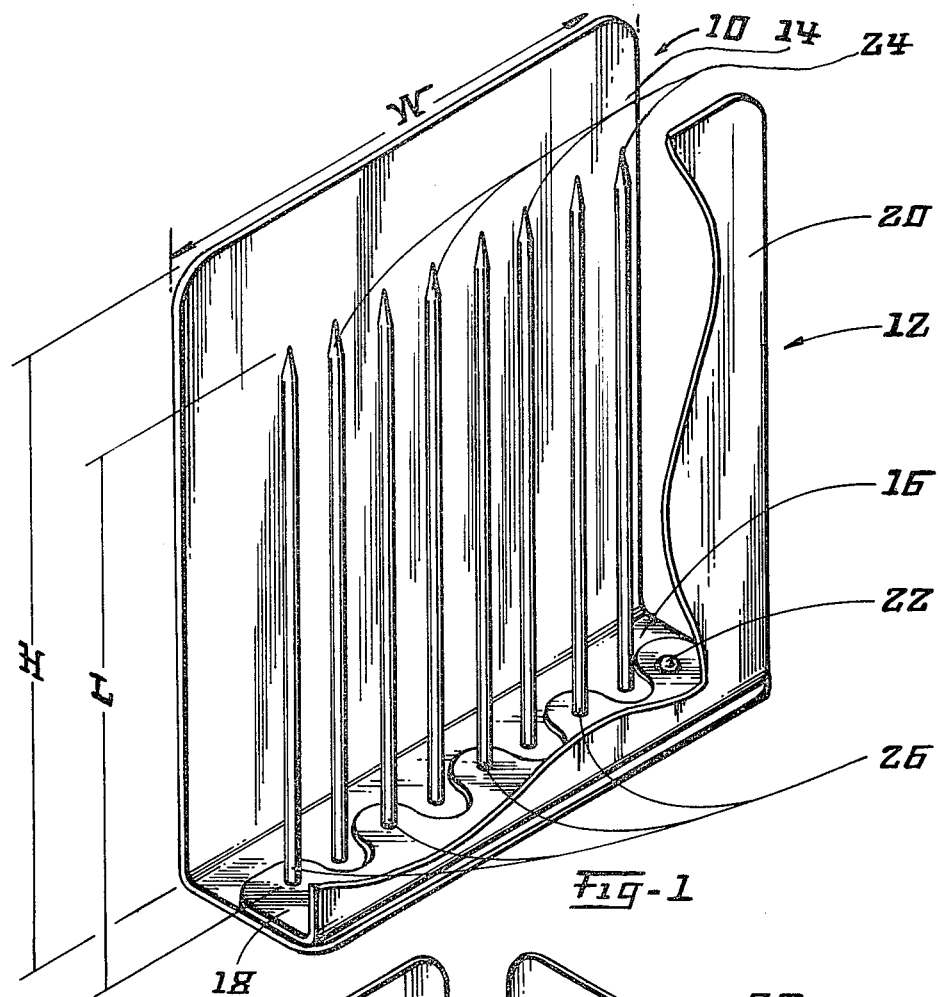
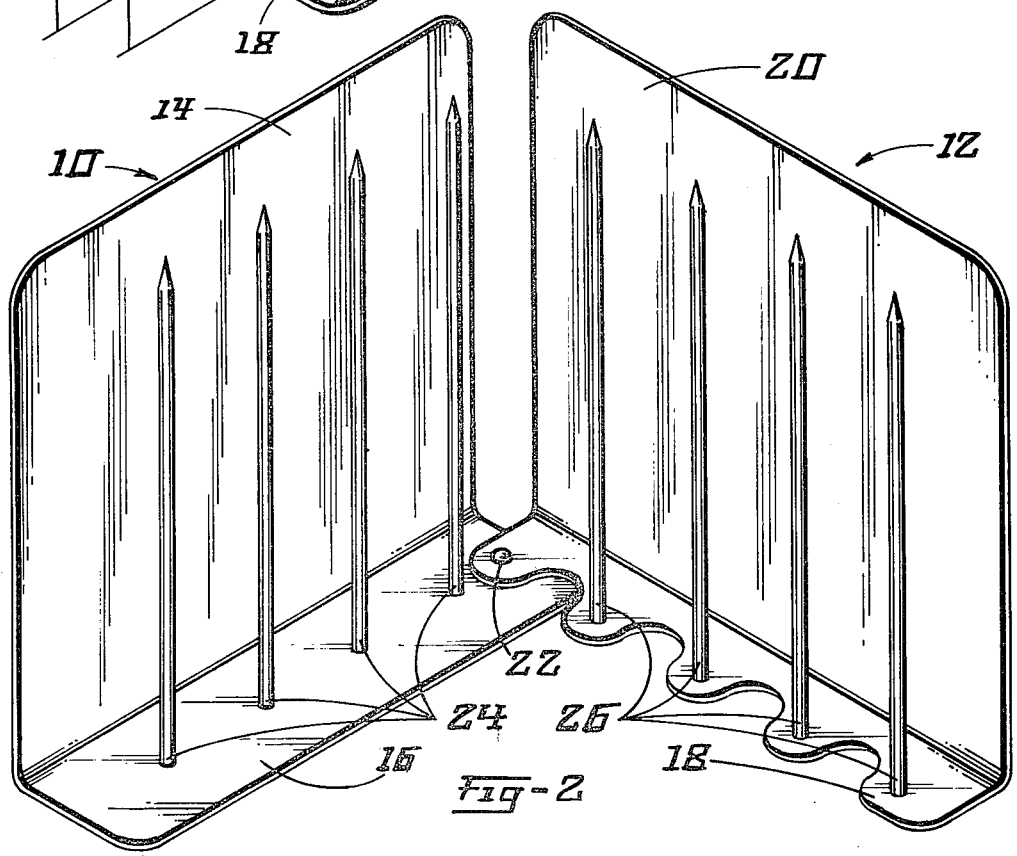

MUFFIN SPLITTER

BACKGROUND OF THE INVENTION

The present invention relates to apparatus for splitting or breaking muffins, or similar items into approximately equal halves.

It is a common practice to slice English muffins, and similar baked goods, into halves before toasting. If the muffins are sliced with an ordinary knife, the halves are often of unequal size and may become stuck in the toaster. Also, most people prefer a rough texture on the surface which have been separated, as would result from breaking or tearing the muffin, rather than the relatively smooth surfaces which result from slicing or cutting.

It is a principal object of the present invention to provide an inexpensive device which may be quickly and simply manipulated to break an English muffin, or similar article, into substantially equal halves.

Other objects will in part be obvious and will in part appear hereinafter.

SUMMARY OF THE INVENTION

In the disclosed embodiment, the muffin splitter is formed in two parts each having base and side portions. A plurality of elongated tines extend fixedly from each of the base portions in respective parallel rows. The two parts are hingedly connected for movement about an axis between a first, or closed position, wherein all tines are arranged in a single, parallel row, and a second or open position, wherein the tines of each part are separated and the respective rows thereof are non-parallel.

In operation, the device is placed in the closed position and a muffin is inserted sideways between the two side portions, with the tines of both parts extending through, or nearly through, the muffin. The parts are then moved about the hinged connection to the open position, thereby breaking the muffin into equal halves which are then removed from between the tines and side portions of the respective parts of the device.

BRIEF DESCRIPTION OF THE DRAWING

FIG. 1 is a perspective view of the device in the closed position with a portion broken away;

FIG. 2 is a perspective view of the device in the open position.

DETAILED DESCRIPTION

Referring now to the drawing, the device is formed in two parts, generally denoted by reference numerals 10 and 12. Part 10 includes base portion 16 and side portion 14, both being planar and preferably formed of a single sheet of material such as metal, plastic, or the like, and arranged perpendicularly to one another. Part 12 is similarly formed to include base portion 18 and side portion 20. Base portions 16 and 18 are hingedly connected near one end of each, as by rivet 22, for movement between the positions illustrated in FIGS. 1 and 2, respectively termed the closed and open positions.

A first plurality of elongated tines 24 extend fixedly, in a parallel row, from base portion 16 to free upper ends which are preferably sharpened, as shown. A second plurality of tines 26 is similarly affixed to base portion 18 in spaced, parallel relation. The respective parts are so formed and connected that all of tines 24 and 26 are in a single, parallel row when the parts are in the closed position, as shown in FIG. 1. The two rows of tines 24 and 26 are substantially spaced, and are non-parallel when the parts are moved about hinged connection 22 to the position of FIG. 2.

It will be further noted that one of tines 24 is alternated with one of tines 26 in the single row of tines formed when in the closed position. Base portions 16 and 18 are superposed, the opposing edge of base portion 18 being formed to admit tines 24 therebetween.

The width (W) of parts 10 and 12 is preferably about equal to the diameter of the muffin or other items primarily intended to be split thereby, e.g., about 3½ inches. The height (H) of the two parts is preferably somewhat greater than the width, e.g., about 4 inches, and the tines are preferably shorter in length (L) than the height of the parts to minimize the possibility of being stuck by the tines when placing a muffin in the device. The distance between the opposing faces of side portions 14 and 20 when the device is in the closed position is approximately equal to the thickness of the items intended to be split, e.g., about 1 inch.

In operation, the parts are placed in the closed position and a muffin is inserted sideways between side portions 14 and 20. Tines 24 and 26 thus will pierce the muffin along spaced lines parallel to its diameter, passing through or nearly through, the muffin at its transverse center. The device is then grasped with one hand holding each part and moved about the hinged connection at rivet 22 to the position of FIG. 2. In so doing, the muffin is split or, more precisely, torn into halves of substantially equal size, with one half being retained between each row of tines and side portion. The separated faces of the muffin have the desired rough texture since the action is that of breaking or tearing rather than cutting or slicing.

Modifications of the disclosed structure within the scope of the invention are readily apparent. For example, the number of tines may be either greater or less than the four in each set shown in the drawing. The end tines may be shorter than those near the center. The axis of the hinged connection may be positioned as desired, either remaining parallel to the tines or being perpendicular thereto along the axis of the row at the base. Although the hinged connection is preferred, the connection may be a sliding one, with the two parts moved linearly toward and away from each other to the closed and open positions respectively.

What is claimed is:

1. Apparatus for splitting muffins, or similar articles, into substantially equal halves comprising:
   a. a first part having a flat, planar sheet forming a side portion and a base portion extending perpendicularly thereto;
   b. a first plurality of elongated tines fixedly attached at one end to said first base portion and extending therefrom in spaced, parallel relation;
   c. a second part having a flat, planar sheet forming a side portion and a base portion extending perpendicularly thereto;
   d. a second plurality of elongated tines fixedly attached at one end to said second base portion and extending therefrom in spaced, parallel relation; and
   e. means connecting said first and second parts for relative movement thereof between a first position wherein said first and second base portions are at least partially juxtaposed, said side portions are in spaced, parallel relation, and all of said first and second plurality of tines are arranged in a single, substantially parallel row lying in a plane substantially midway between and parallel to the planes of the sheets forming said first and second side portions, at least some of the tines of said first plurality being interspersed in said row between tines of said second plurality, and a second position, wherein the tines of said first plurality lie in a plane spaced from the plane of the tines of said second plurality.

2. The invention according to claim 1 wherein said means comprises a hinged connection for movement of said parts about a single axis.

3. The invention according to claim 2 wherein said axis is parallel to all of said tines when said base portions are in said first position.

4. The invention according to claim 3 wherein each of said base portions are substantially planar.

5. The invention according to claim 3 wherein said hinged connection is between said first and second base portions at juxtaposed points on each spaced from the outermost of each of said pluralities of tines.

6. The invention according to claim 1 wherein said base and side portions of the respective parts are integrally formed from a single, planar sheet of material.

* * * * *